(12) United States Patent
Jang et al.

(10) Patent No.: US 10,960,866 B2
(45) Date of Patent: Mar. 30, 2021

(54) ACTUATOR HAVING DOUBLE-GEAR STRUCTURE FOR ELECTROMECHANICAL PARKING BRAKE

(71) Applicant: KEYANG ELECTRIC MACHINERY CO., LTD., Seoul (KR)

(72) Inventors: Su Gil Jang, Cheonan-si (KR); Seong Oh Lee, Ansan-si (KR); Jang Soo Park, Suwon-si (KR)

(73) Assignee: KEYANG ELECTRIC MACHINERY CO., LTD., Seoul (KR)

(*) Notice: Subject to any disclaimer, the term of this patent is extended or adjusted under 35 U.S.C. 154(b) by 44 days.

(21) Appl. No.: 16/368,103

(22) Filed: Mar. 28, 2019

(65) Prior Publication Data

US 2020/0307540 A1 Oct. 1, 2020

(51) Int. Cl.

| | | |
|---|---|---|
| *B60T 13/74* | (2006.01) | |
| *F16D 65/18* | (2006.01) | |
| *F16H 3/58* | (2006.01) | |
| *F16D 65/02* | (2006.01) | |
| *B60T 7/04* | (2006.01) | |
| *F16D 121/24* | (2012.01) | |
| *F16D 125/48* | (2012.01) | |
| *F16H 3/44* | (2006.01) | |

(52) U.S. Cl.
CPC ............ *B60T 13/746* (2013.01); *B60T 7/045* (2013.01); *F16D 65/02* (2013.01); *F16D 65/18* (2013.01); *F16D 2121/24* (2013.01); *F16D 2125/48* (2013.01); *F16H 3/44* (2013.01); *F16H 3/58* (2013.01)

(58) Field of Classification Search
CPC .......... F16D 65/02; F16D 65/14; F16D 65/16; F16D 65/18; F16D 2121/24; F16D 2125/48; F16D 2125/50; B60T 13/746; F16H 3/44; F16H 3/46; F16H 3/58

See application file for complete search history.

(56) References Cited

U.S. PATENT DOCUMENTS

| | | | | |
|---|---|---|---|---|
| 9,290,266 | B2* | 3/2016 | Robertson | F16H 3/724 |
| 9,616,862 | B2* | 4/2017 | Qi | B60T 13/746 |
| 2009/0308698 | A1* | 12/2009 | Park | F16D 65/18 |
| | | | | 188/17 |
| 2015/0075923 | A1* | 3/2015 | Jang | F16D 65/18 |
| | | | | 188/162 |
| 2015/0167761 | A1* | 6/2015 | Son | F16D 65/18 |
| | | | | 188/72.6 |
| 2017/0023081 | A1* | 1/2017 | Sala | F16D 65/18 |
| 2017/0082158 | A1* | 3/2017 | Son | F16D 65/18 |
| 2017/0082159 | A1* | 3/2017 | Son | F16D 65/18 |
| 2019/0219117 | A1* | 7/2019 | Choi | F16D 65/18 |
| 2020/0307539 | A1* | 10/2020 | Jang | B60T 7/045 |
| 2020/0309212 | A1* | 10/2020 | Jang | F16D 65/18 |

FOREIGN PATENT DOCUMENTS

| | | |
|---|---|---|
| KR | 10-1041553 B1 | 6/2011 |
| KR | 10-2013-0071256 A | 6/2013 |

\* cited by examiner

*Primary Examiner* — Thomas J Williams
(74) *Attorney, Agent, or Firm* — Novick, Kim & Lee, PLLC; Jae Youn Kim

(57) ABSTRACT

Provided is an actuator having a double-gear structure for an electromechanical parking brake. The actuator includes: a main housing having a motor seat and a gear seat; a motor assembly disposed in the motor seat and providing torque; and a gear assembly rotated by the torque from the motor assembly and performing a reduction function through a plurality of gears.

5 Claims, 6 Drawing Sheets

ACTUATOR HAVING DOUBLE-GEAR STRUCTURE FOR ELECTROMECHANICAL PARKING BRAKE

BACKGROUND OF THE INVENTION

Field of the Invention

The present invention relates to an actuator that performs electromechanical parking brake and, more particularly, to an actuator for a electromechanical parking brake that can various gear ratios through a double-gear teeth structure including different gears on the outer side and the inner side of a final gear of a gear assembly.

Description of the Related Art

An actuator for an automotive electromechanical parking brake is an apparatus for operating friction pads disposed on a caliper of a disc brake system for parking. The actuator is automatically operated when a user operates a switch for an electromechanical parking brake, and for this purpose, the actuator includes an electromechanical parking brake motor and a gear assembly (power transmission device) for transmitting power from the motor.

According to the way of using such an electromechanical parking brake, when a driver presses down a parking brake switch, torque of the motor of the actuator is transmitted to an input shaft of a caliper through a gear assembly (power transmission device) such as a reducer. The input shaft receiving the power is rotated, and accordingly, a pressing connection sleeve moves forward, and a piston and a caliper housing that accommodate the connection sleeve are moved close to each other by the forward movement of the sleeve. Further, two friction pads mounted on the piston and the caliper housing press both sides of a disc to prevent rotation, whereby parking is achieved.

Actuators for electromechanical parking brakes of the related art are largely changed in size in accordance with the required performance standards. For example, when it is required to increase a gear ratio to satisfy required performance, at least some of built-in gears are increased in size, so the size of the entire actuator is increased. However, there are design conditions of a predetermined level or less for the sizes of actuators, so it is difficult to satisfy both performance standards and size conditions.

In particular, when a gear assembly has a two-stage planetary gear set, a large reduction ration is possible, but the entire two-stage planetary gear set is engaged with one ring gear surrounding the planetary gear set, so it is difficult to adjust the gear ratio of the planetary gear set. This is because the entire housing including the ring gear has to be replaced to change the planetary gear set to adjust the gear ratio.

Further, the two-stage planetary gear set increases the entire height of the actuator, thereby increasing the size of the entire actuator.

Documents of Related Art (Patent Document 1) Korean Patent No. 10-1041553
(Patent Document 2) Korea Patent Application Publication No. 10-2013-0071256

SUMMARY OF THE INVENTION

The present invention has been made in an effort to solve the problems in the related art and an object of the preset invention is to engage and rotate any stage of a two-stage planetary gear set with the inner side of a final gear of a gear assembly.

Another object of the present invention is to engage and rotate the outer side and the inner side of one final gear with idle gears and a planetary gear set.

In order to achieve the objects of the present invention, an aspect of the present invention provides an actuator having a double-gear structure for an electromechanical parking brake, the actuator including: a main housing having a motor seat and a gear seat; a motor assembly disposed in the motor seat and providing torque; and a gear assembly rotated by the torque from the motor assembly and performing a reduction function through a plurality of gears, in which the gear assembly includes; an idle gear connected to the motor assembly; a final gear having a first gear formed on an outer circumferential surface and rotating in mesh with the idle gear and a second gear formed on an inner circumferential surface; a ring gear disposed in the gear seat under the final gear and having revolution gear teeth on an inner side; and a planetary gear set composed of first-stage planetary gears and second-stage planetary gears such that the first-stage planetary gears are disposed at an upper portion and rotated in mesh with a second gear of the final gear and the second-stage planetary gears are disposed at a lower portion and rotated in mesh with the revolution gear teeth of the ring gear.

The final gear may include: a gear body; a first gear formed on an outer circumferential surface of the gear body and engaging with the idle gear; and a second gear formed on an inner circumferential surface of a first rotational space recessed on a bottom of the gear body and engaging with the first-stage planetary gears of the planetary gear set.

When the final gear and the ring gear are stacked, the first rotational space of the final gear and the second rotational space defined inside the ring gear may define one rotational space by being connected to each other, and the planetary gear set may be accommodated in the rotational space.

The first-stage planetary gears and the second-stage planetary gears of the planetary gear set may be stacked on each other and rotated about the same rotary shafts, the first-stage planetary gears may be rotated in the first rotational space of the final gear, and the second-stage planetary gears may be rotated in the second rotational space of the ring gear.

The first-stage planetary gears of the planetary gear set may include: a first carrier rotating about a main gear shaft and having a second sun gear at a center; and first planetary gears connected to several first planetary gear shafts of the first carrier, respectively, accommodated in the first rotational space of the final gear, and rotating in mesh with the second gear, and the second-stage planetary gears may include: a second carrier rotating about the main gear shaft and disposed in the second rotational space of the ring gear under the first carrier; and second planetary gears connected to several second planetary gear shafts of the second carrier, respectively, rotated by the second sun gear, accommodated in the second rotational space of the ring gear, and rotating in mesh with the revolution gear teeth of the ring gear.

The installation frame may be combined with the main housing, the idle gear and the final gear are disposed on the installation frame, and the ring gear may be separably coupled to a lower portion of the installation frame and is accommodated in the gear seat of the main housing.

The first sun gear of the final gear may be disposed at a center of a first rotational space of the final gear and may be manufactured separately from the final gear and combined with the final gear or may be manufactured through insert injection molding, and a gear cover covering the installation frame may rotatably support an upper end of the first sun gear protruding upward from the final gear.

The actuator having a double-gear structure for an electromechanical parking brake according to the present invention has the following effects.

The two-stage planetary gear set of the gear assembly is not entirely engaged with the ring gear, but the first stage is engaged with the final gear and the second stage is engaged with the ring gear. Accordingly, the entire planetary gear set is not restricted by the ring gear, a gear ratio can be more freely changed in the same package size, and accordingly, design can become more free.

Further, the final gear performs first-stage reduction and the planetary gear set performs second-stage and third-stage reduction, thereby perform a total of three stages of reduction. Accordingly, it is possible to achieve a sufficiently large gear ratio in a predetermined size, so the performance of the actuator is improved.

In particular, the planetary gear set is surrounded in the rotational space defined by the final gear and the ring gear and engaged with the gears therein, so the size and weight of the entire package of the actuator can be further reduced.

Further, not only the final gear, but also the ring gear can be easily separated from the installation frame, so the work for changing the gear ration can be easily achieved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

An electromechanical parking brake actuator (hereafter, referred to as an 'actuator') according to the present invention generates large torque by reducing driving of a motor 30 and transmits the torque to the outside to achieve the function of an electromechanical parking brake. To this end, a motor 30 and a gear assembly 50 are disposed in an actuator assembly of the present invention. The gear assembly 50 means the entire structure composed of several gears in the following description.

Figure 1:
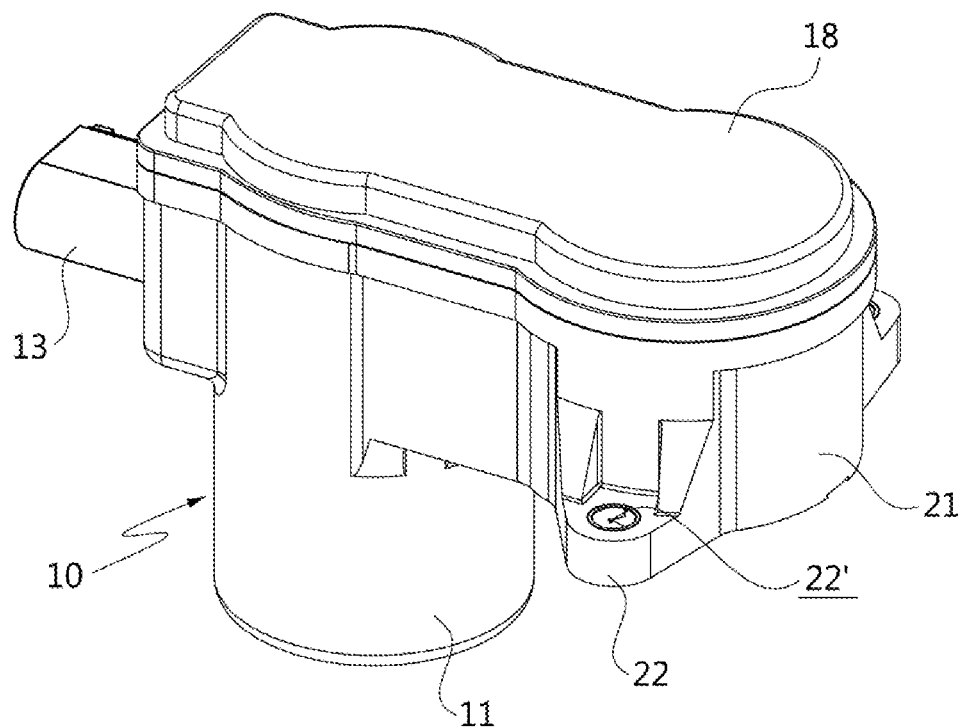
FIG. 1 is a perspective view showing an embodiment of an actuator having a double-gear structure for an electromechanical parking brake according to the present invention.

Referring first to FIG. 1, the entire outer structure of an actuator is formed by combining a main housing 10 and a cover 18. When the main housing 10 and the cover 18 are combined, a closed installation space 15 is defined therein and several parts are disposed in the installation space 15 to operate the actuator. When the main housing 10 and the cover 18 are combined, only a connector socket 13 and a resultant output shaft 80 protruding downward are partially exposed without the other parts exposed out of the installation space 15. A relative connector (not shown) is inserted in a coupling space of the connector socket 13.

Figure 2:
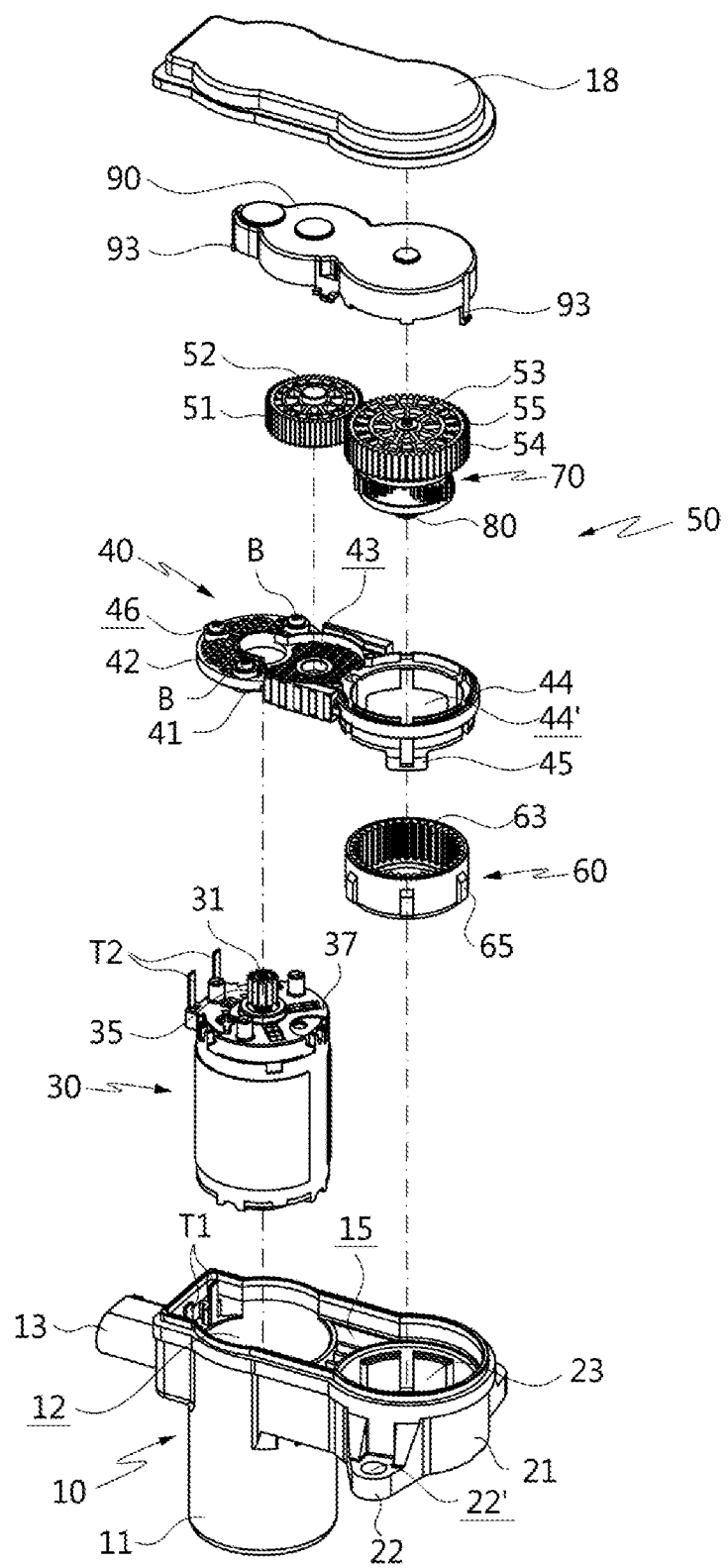
FIG. 2 is an exploded perspective view of the embodiment shown in FIG. 1.
Figure 3:
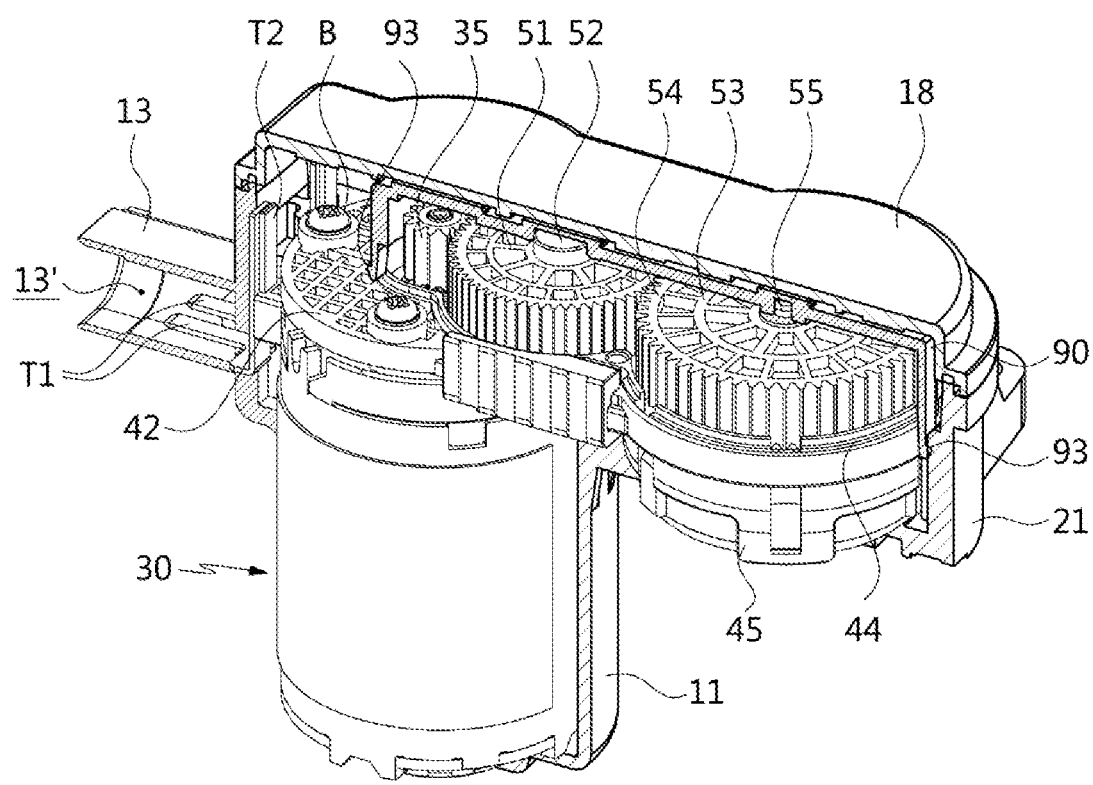
FIG. 3 is a perspective view showing the internal structure of FIG. 1 by partially cutting a main housing and a cover.

In the configuration of the main housing 10, as shown in FIGS. 2 and 3, the main housing 10 has a motor seat 11 and a gear seat 21 therein. The motor seat 11 and the gear seat 21 are spaced apart from each other and have parallel rotational axes. The main housing 10 is a single unit, and is made of synthetic resin through injection molding in this embodiment.

The main housing 10 can be largely divided into two parts, which are the motor seat 11 and the gear seat 21. Referring to FIG. 2, the motor seat 11 and the gear seat 21 are respectively disposed at the left and right ends of the main housing 10. The connector socket 13 described above is formed close to the motor seat 11 and terminals T1 disposed in the coupling space 13' of the connector socket 13 may be electrically connected in contact with motor terminals T2 of a brush card assembly 37 to be described below.

An installation frame 40 to be described below is disposed in the installation space 15 at the upper portion in the main housing 10. The installation frame 40 fixes the parts constituting the gear assembly 50, and for example, an idle gear 51 and a final gear 53 are disposed therein and a ring gear 60 is separably combined with the inner housing 30. The installation space 12 extends left and right at the upper portion in the main housing 10 and is closed by the cover 18.

There is a motor accommodation space 12 at the motor seat 11 and the motor 30 is accommodated in the motor accommodation space 12. A pinion gear 35 is fitted on a motor shaft 31 of the motor 30 and protrudes upward. The brush card assembly 37 is coupled to the upper portion of the motor 30 and power is applied through the brush card assembly 37. To this end, the brush card assembly 37 has the motor terminals T2 for receiving power from the outside and the motor terminals T2 are connected to the terminals T1 of the connector socket 13. A rectifier (not shown) changes the direction of a current flowing through a coil. An armature core of the motor 30 is three-dimensionally formed by stacking a plurality of core plates and has a substantially cylindrical shape.

There is a gear accommodation space at the gear seat 21 of the main housing 10. A ring gear 60 to be described below may be disposed in the gear accommodation space 23 and the bottom of the gear accommodation space 23 is open, so an output shaft 80 can be exposed downward through the opening. The gear accommodation space 23 is connected to the installation space 15 and has a shape corresponding to the ring gear 60. Reference numeral '22' indicates an installation bracket and reference numeral "22" indicates a fastening hole in which a fastener in which a fastener is inserted.

The installation frame 40 is combined with the main housing 10. The installation frame 40 is coupled to the installation space 15 of the main housing 10, thereby fixing the parts of the gear assembly 50. The installation frame 40 is a kind of frame structure extending left and right and can be fixed to the main housing 10 by bolts B. A motor coupling part 42 is disposed at a side of the main body 41 forming the frame of the installation frame 40 and the pinion gear 35 of the motor 30 protrudes through the motor coupling part 42. A gear groove 43 to which an idle gear shaft 52 that is the rotational center of an idle gear 51 is formed at the center portion adjacent to the motor coupling part 42.

A gear coupling part 44 is disposed opposite the motor coupling part 42 of the installation frame 40. The gear coupling part 44 is formed substantially in a ring shape, and the final gear 53 and a planetary gear set 70 are coupled to the gear coupling part 44. Coupling hooks 45 protrudes from the lower portion of the gear coupling part 44 and coupling steps 65 of the ring gear 60 to be described below are coupled and locked to the coupling hooks 45. Several coupling hooks 45 may be disposed around the gear coupling portion 44. The planetary gear set 70 can be considered as being disposed in a central space 44' corresponding to the center of the gear coupling part 44. Reference numeral 46 indicates fastening grooves 46 and fastening protrusions 93 of a gear cover 90 to be described below is inserted in the fastening grooves.

The gear assembly 50 disposed on the installation frame 40 is described hereafter. First, the idle gear 51 is disposed at the center of the installation frame 40. The idle gear 51 is connected to the motor assembly, and more accurately, is rotated in mesh with the pinion gear 35 that is rotated by the motor 30. The idle gear 51 changes the rotational direction in mesh with the pinion gear 35 and further performs primary reduction. A pinion gear shaft 52 is rotated with primary reduction performed between the idle gear 51 and the pinion gear 35. The primary reduction is performed with a reduction ratio that is smaller than those of secondary reduction and third reduction to be described below. The final gear 53 of the gear assembly 50 is engaged with the idle gear 51, so the pinion gear 35 and the final gear 53 are rotated in the same direction. That is, the idle gear 51 connects the pinion gear 35 and the final gear 53.

The gear assembly 50 includes the final gear 53. The final gear 53 is disposed on the gear coupling part 44 of the installation frame 40 and rotates in mesh with the idle gear 51, thereby transmitting torque thereof to the planetary gear set 70 to be described below. The final gear 53 has a substantially cylindrical shape that is the outer shape of common gears, but is a double gear having a first gear 54 and a second gear 57 that are different from each other.

Figure 5:
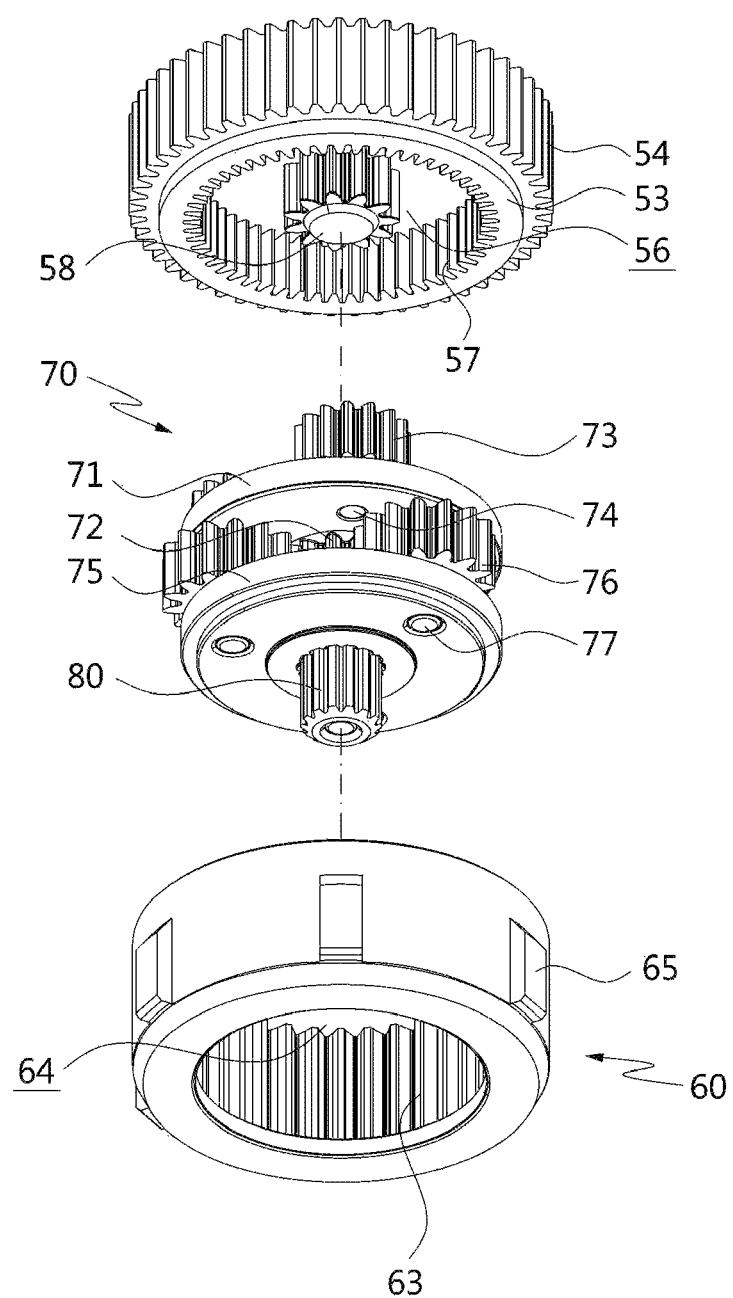
FIG. 5 is an exploded perspective view of the configuration of FIG. 4.

Referring to FIG. 5, the final gear 53 has the first gear 54 and the second gear 57 on the gear body that is a fundamental structure. The gear body has a substantially cylindrical shape and the first gear 54 is formed on the outer circumferential surface of the gear body. The first gear 54 is engaged with the idle gear 51 to rotate the final gear 53.

The second gear 57 is formed on the inner circumferential surface of a first rotational space recessed on the bottom of the gear body. The bottom of the gear body that faces the planetary gear set 70 is recessed inward and the first rotational space 56 is defined therein. The second gear 57 is formed on the inner circumferential surface of the first rotational space 56. The second gear 57 is engaged with first-stage planetary gears 71 and 73 of the planetary gear set 70. More accurately, the first rotational space 56 can be considered as the space between the second gear 57 and a first sun gear 58 to be described below.

As described above, the final gear 53 has two gears, so it can be engaged with the idle gear 51 and can rotate the first-stage planetary gears 71 and 73 of the planetary gear set 70 while surrounding the first-stage planetary gears 71 and 73. Accordingly, since the entire planetary gear set 70 is not restricted by the ring gear 60 to be described below, a gear ratio can be more freely changed in the same package size. Furthermore, the first-stage planetary gears 71 and 73 of the planetary gear set 70 are rotated in the first rotational space 56, so the entire size and weight of the actuator including the gear assembly 50 can be further decreased.

Figure 4:
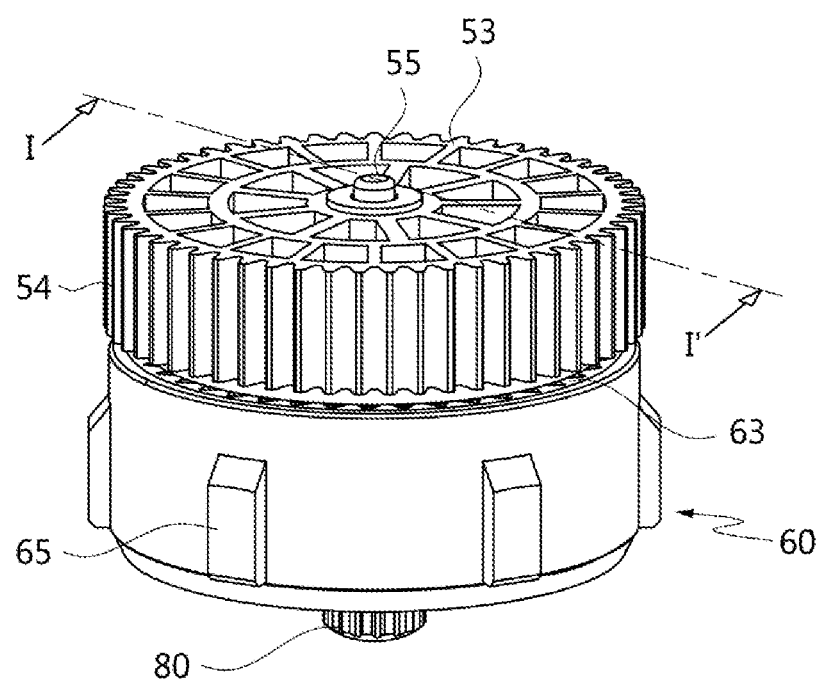
FIG. 4 is a perspective view showing the configuration of a gear assembly according to an embodiment of the present invention.
Figure 6:
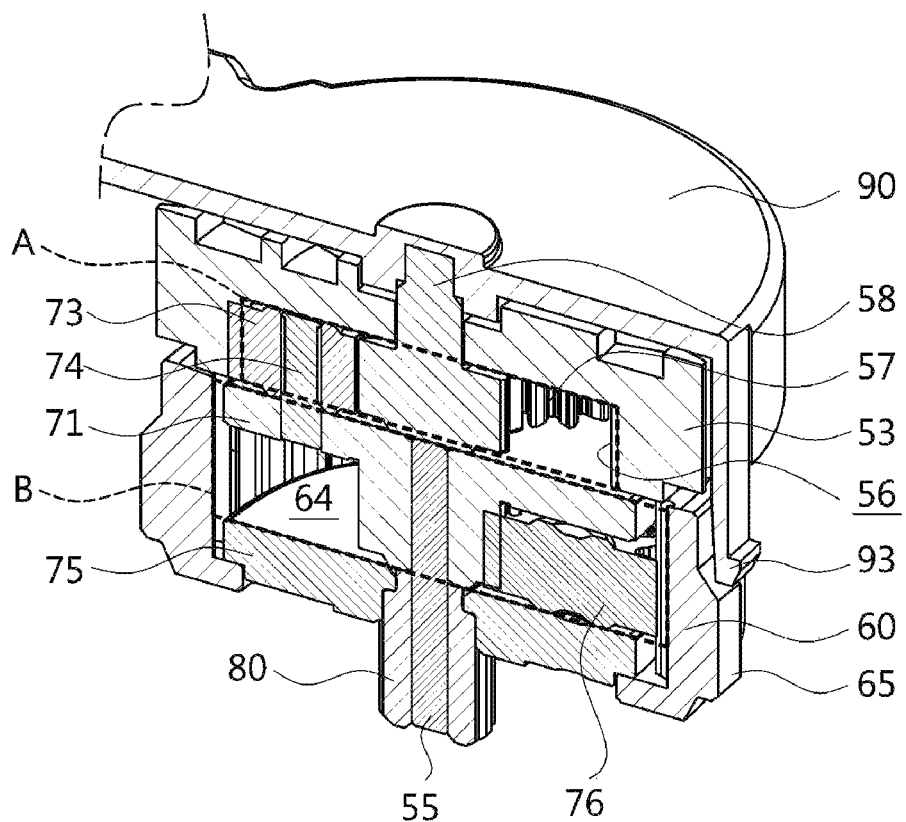
FIG. 6 is a cross-sectional view taken along line I-I' of FIG. 4.

Referring to FIGS. 5 and 6, the final gear 53 has the first sun gear 58. The first sun gear 58 is disposed at the center of the first rotary space 56 of the final gear 53 and rotates first planetary gears 73 of the first-stage planetary gears 71 and 73 of the planetary gear set 70. The first planetary gears 73 are disposed around the first sun gear 58, so when the first sun gear 58 is rotated, the first planetary gears 73 are rotated. Obviously, as described above, the first planetary gears 73 are also engaged on the outer sides with the second gear 57 formed on the inner circumferential surface of the first rotational space 56, so they are rotated in mesh with the first sun gear 58 inside and in mesh with the second gear 57 outside. For reference, a gear cover 90 not shown in FIG. 4 is further shown in FIG. 6 to help understanding, and as shown in the figure, the gear cover 90 fixes the upper end of the first sun gear 58 of the final gear 53. As shown in FIGS. 3 and 6, the upper portion 58 of the first sun gear 58 is fixed to the gear cover 90 through the final gear 53. Accordingly, the first sun gear 58 can keep fixed without rotating when the final gear 53 is rotated. The first sun gear 58 may be manufactured separately from the final gear 54 and then coupled to the gear cover 90 by a key groove structure.

The ring gear 60 is disposed under the gear assembly 50. The ring gear 60 is accommodated in the gear seat 21 of the main housing 10 and is combined with the installation frame 40 described above and accommodated in the gear seat 21. The ring gear 60 is formed substantially in a cylindrical shape and has revolution gear teeth 63 on the inner side. The revolution gear teeth 63 enable second-stage planetary gears 75 and 76 of the planetary gear set 70 to rotate. The ring gear 60 is manufactured as a part separated from the main housing 10 and the installation frame 40, so it can be separated Coupling steps 65 are formed on the outer circumferential surface of the ring gear 60. The coupling steps 65 protrude from the outer circumferential surface of the ring gear 60 and are portions to which the coupling hooks 45 of the installation frame 40 described above are locked. When the coupling hooks 45 are locked to the coupling step 65, the ring gear 60 can be fixed to the installation frame 40. The ring gear 60 is open upward and downward, so the planetary gear set 70 may be inserted over the ring gear 60 and a resultant output shaft 80 may protrude under the ring gear 60. The inside of the ring gear 60 is a second rotational space 64, so the second-stage planetary gears 75 and 76 of the planetary gear set 70 can be rotated.

The gear assembly 50 includes the planetary gear set 70. The planetary gear set 70 is composed of several planetary gears and performs reduction, but the planetary gear set 70 performs two steps of reduction in the present invention. In the planetary gear set 70, the first-stage planetary gears 71 and 73 and second-stage planetary gears 75 and 76 are stacked, thereby respectively performing second reduction and third reduction. The planetary gear set 70 is disposed in the gear seat 21 of the main housing 10, and as will be described below, is rotated while being surrounded by the final gear 53 and the ring gear 60.

The final gear 53 and the ring gear 60 described above have the first rotational space 56 and the second rotational speed 64, respectively, and the first rotational space 56 and the second rotational speed 64 are connected to each other, thereby defining one rotational space. The planetary gear set 70 is accommodated in the rotational space. More accurately, as shown in FIG. 6, a section A defined by the first rotational space 56 and a section B defined by the second rotational space 64 are connected to each other and the planetary gear set 70 is accommodated in the sections, in which the first-stage planetary gears 71 and 73 are positioned in the first rotational space 56 at a relatively upper portion and the second-stage planetary gears 75 and 76 are positioned in the second rotational space 64 at a relatively lower portion.

According to this structure of the gear assembly, the planetary gear set 70 is surrounded in the rotational spaces defined by the final gear 53 and the ring gear 60 in mesh with each other, so the size and weight of the entire package of the actuator can be further reduced. If the internal spaces of the final gear 53 and the ring gear 60 are not used, the entire height of the gear assembly is unavoidably increased.

The structure of the planetary gear set 70 is described hereafter. The planetary gear set 70 is composed of the first-stage planetary gears 71 and 73 and the second-stage planetary gears 75 and 76. The first-stage planetary gear 71 and 73 at the upper portion are rotated in mesh with the second gear 57 and the first sun gear 58 of the final gear 53 and the second-stage planetary gears 75 and 76 are rotated in mesh with the revolution gear teeth 63 of the ring gear 60. The first planetary gears 71 and 73 and the second planetary gears 75 and 75 are stacked over and under each other and respectively perform the reduction functions while rotating.

The first-stage planetary gears 71 and 73 of the planetary gear set 70 include a first carrier 71 that rotates about a main gear shaft 55, and first planetary gears 73 respectively connected to several first planetary gear shafts 74 of the first carrier 71, disposed in the first rotational space 56 of the final gear 53, and rotating in mesh with the sun gear 58. The first planetary gears 73 rotate about the first planetary gear shafts 74 and also revolve with the first carrier 71 in the first rotational space 56. The first planetary gears 73 revolving in mesh with the second gear 57 and the sun gear 58 of the final gear 53 rotate the first carrier 71 and perform secondary reduction between the final gear 53 and the first planetary gears 73.

As shown in FIG. 5, a second sun gear 72 protrudes from the first carrier 71. The second sun gear 72 protrudes downward from the center of the first carrier 71 and rotates integrally with the first carrier 71. The second sun gear 72 rotates second planetary gears 76 to be described below and the second planetary gears 76 are disposed around the second sun gear 72, so when the second sun gear 72 is rotated, the second planetary gears 76 are rotated.

The second-step planetary gears 75 and 76 have a similar structure to the first-step planetary gears 71 and 73. In detail, the second-stage planetary gears 75 and 76 include a second carrier 75 disposed under the first carrier 71 in the second rotational space 64 of the ring gear 60 and rotating about the main gear shaft 55, and second planetary gears 76. The second planetary gears 76 are respectively connected to second planetary gear shafts 77 of the second carrier 75. The second planetary gears 76 rotate about the second planetary gear shafts 76 and also are accommodated in the second rotational space 64 of the ring gear 60 and revolve in mesh with revolution gear teeth 63 of the ring gear 60, whereby third reduction is generated. The rotation with third reduction is transmitted to the outside through the output shaft 80 connected to the main gear shaft 55.

As described above, since the planetary gear set 70 of the present invention, the final gear 53, and the ring gear 60 are surrounded and engaged with each other in the first rotational space 56 of the final gear 53 and the second rotational space 64 of the ring gear 60, the entire package is decreased. Further, since only the second-stage planetary gears 75 and 76 of the planetary gear set 70 are restricted by the ring gear 60, the gear ratio can be more freely changed within the same package size. For example, it is possible to change the second-stage gear ratio by replacing the final gear 53 with another final gear in which the second gear 57 and the first sun gear 58 have other sizes and by applying first-stage planetary gears 71 and 73 fitting to them.

The gear assembly 50 is closed by the gear cover 90. As shown in FIGS. 1 to 3, the gear cover 90 is combined with the installation frame 40, thereby closing the gear assembly 50. The inner cover 18 has fastening protrusions 93 and the fastening protrusions 93 are locked in the fastening grooves 46 of the installation frame 40. The gear cover 90 can be coupled to the installation frame 40 by the fastening protrusions 93 and the fastening grooves 46.

A process of operating the actuator having a double-gear structure for an electromechanical parking brake according to the present invention is described hereafter.

First, when external power is supplied through the connector socket 13, the motor 30 is operated. The operation of the motor 30 rotates the motor shaft 31, so the pinion gear 35 fitted on the motor shaft 31 is rotated. The pinion gear 35 is rotated with the motor shaft 31, thereby rotating the idle gear engaged with it in the opposite direction. Primary reduction is generated in this process between the idle gear 51 and the pinion gear 35.

With the primary reduction generated and the rotational direction changed, the pinion gear 35 is rotated and the final gear 53 is rotated by the first gear 54 engaged with the pinion gear 35 of the final gear 53. As the final gear 53 is rotated, the first sun gear 58 at the center of the first rotational space 56 and the second gear 57 on the inner circumferential surface of the final gear 53 rotate the planetary gear set 70. More accurately, the second gear 57 and the first sun gear 58 operate the first-stage planetary gears 71 and 73 of the planetary gear set 70. That is, a total of three first planetary gears 73 turn (revolve) in mesh with the second gear 57 and the first sun gear 58 and also turn (rotate) about the first planetary gear shafts 7. While the first planetary gears 73 revolve, the first carrier 71 is rotated. Secondary reduction is generated in this process.

As the first carrier 71 is rotated, the second sun gear 72 of the first carrier 71 rotates the second-stage planetary gears 75 and 76. The second planetary gears 76 arranged around the second sun gear 72 are rotated in mesh with the second sun gear 72. The second planetary gears 76 rotate about second planetary gear shafts and revolve in mesh with the revolution gear teeth 63 of the ring gear 60. In this process, the second carrier 75 is rotated. Third reduction is generated while the second planetary gears 75 and 76 are rotated.

As described above, in the present invention, the gears of the two-stage planetary gear set 70 of the gear assembly 50 are not all engaged with the ring gear 60, but the first-stage planetary gears 71 an d73 are rotated in mesh with the final gear 53 and the second-stage planetary gears 75 and 76 are rotated in mesh with the ring gear 60. Accordingly, the entire planetary gear set 70 is not restricted by the ring gear 60, a gear ratio can be more freely changed in the same package size, and accordingly, design can become more free.

Finally, since the main rotary shaft 55 is fixed to the second carrier 75, the main rotary shaft 55 is rotated with the second carrier 75. The output shaft 80 is disposed at the lower end of the main rotary shaft 55 and finally provides torque to the outside. That is, power is transmitted to the outside through the resultant output shaft 80, thereby performing electrochemical parking.

What is claimed is:

1. An actuator having a double-gear structure for an electromechanical parking brake, the actuator comprising:

a main housing having a motor seat and a gear seat;
a motor assembly disposed in the motor seat and providing torque; and
a gear assembly rotated by torque from the motor assembly and performing a reduction function,
wherein the gear assembly includes;
an idle gear connected to the motor assembly;
a final gear separably disposed in the gear seat, and having first gear teeth disposed on an outer circumferential surface thereof and rotating in mesh with the idle gear and second gear teeth disposed on an inner circumferential surface thereof;
a ring gear disposed in the gear seat under the final gear, separably fixed to an installation frame disposed in the main housing, and having revolution gear teeth on an inner side; and
a planetary gear set including first-stage planetary gears having a first carrier and second-stage planetary gears having a second carrier such that the first-stage planetary gears are disposed at an upper portion and rotated in mesh with the second gear teeth of the final gear and the second-stage planetary gears are disposed at a lower portion and rotated in mesh with the revolution gear teeth of the ring gear,
wherein the final gear further includes a gear body,
wherein the second gear teeth are disposed in a first rotational space recessed on a bottom of the gear body and engages with the first-stage planetary gears of the planetary gear set, and
wherein the final gear further includes a first sun gear protruding, inside the first rotational space, from the final gear at a position corresponding to a center of the first rotational space,
when the final gear and the ring gear are stacked, such that a lower surface of the final gear and an upper surface of the ring gear are in direct contact with each other, the first rotational space of the final gear and a second rotational space defined inside the ring gear define one rotational space by being connected to each other, and the planetary gear set is accommodated in the one rotational space, and
wherein the upper part of the one rotational space is covered by the final gear, the lower part of the one rotational space is covered by the second carrier of the second-stage planetary gear, and the side of the one rotational space is surrounded by the second gear teeth of the final gear and the revolution gear teeth.

2. The actuator of claim 1, wherein the first-stage planetary gears and the second-stage planetary gears of the planetary gear set are stacked on each other and rotated about a same rotary shaft, the first-stage planetary gears are rotated in the first rotational space of the final gear, and the second-stage planetary gears are rotated in the second rotational space of the ring gear.

3. The actuator of claim 2, wherein the first-stage planetary gears of the planetary gear set include:
the first carrier rotating about a main gear shaft and having a second sun gear at a center; and
first planetary gears connected to several first planetary gear shafts of the first carrier, respectively, accommodated in the first rotational space of the final gear, and rotating in mesh with the second gear teeth, and
the second-stage planetary gears include:
the second carrier rotating about the main gear shaft and disposed in the second rotational space of the ring gear under the first carrier; and
second planetary gears connected to several second planetary gear shafts of the second carrier, respectively, rotated by the second sun gear, accommodated in the second rotational space of the ring gear, and rotating in mesh with the revolution gear teeth of the ring gear.

4. The actuator of claim 1, wherein the installation frame is combined with the main housing, the idle gear and the final gear are disposed on the installation frame, and the ring gear is separably coupled to a lower portion of the installation frame and is accommodated in the gear seat of the main housing.

5. The actuator of claim 4, wherein the first sun gear of the final gear is disposed at the center of the first rotational space of the final gear and is manufactured separately from the final gear and combined with the final gear or manufactured through insert injection molding, and a gear cover covering the installation frame rotatably supports an upper end of the first sun gear protruding upward from the final gear.

* * * * *